US012243468B2

(12) United States Patent
Park et al.

(10) Patent No.: US 12,243,468 B2
(45) Date of Patent: Mar. 4, 2025

(54) DISPLAY DEVICE

(71) Applicant: Samsung Display Co., Ltd., Yongin-si (KR)

(72) Inventors: Heesook Park, Suwon-si (KR); Kyoungho Lim, Hwaseong-si (KR); Daye Moon, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 59 days.

(21) Appl. No.: 18/109,995

(22) Filed: Feb. 15, 2023

(65) Prior Publication Data

US 2024/0038133 A1 Feb. 1, 2024

(30) Foreign Application Priority Data

Jul. 27, 2022 (KR) ........................ 10-2022-0093103

(51) Int. Cl.
*G09G 3/20* (2006.01)

(52) U.S. Cl.
CPC ... *G09G 3/2092* (2013.01); *G09G 2320/0233* (2013.01); *G09G 2330/021* (2013.01)

(58) Field of Classification Search
CPC ......... G09G 3/2092; G09G 2320/0233; G09G 2330/021
See application file for complete search history.

(56) References Cited

U.S. PATENT DOCUMENTS

| | | | | |
|---|---|---|---|---|
| 2013/0187934 | A1* | 7/2013 | Kim | G09G 3/2003 345/501 |
| 2019/0156725 | A1* | 5/2019 | Hsu | G09G 3/2003 |
| 2019/0156727 | A1* | 5/2019 | Minaki | G09G 3/2092 |
| 2019/0156728 | A1* | 5/2019 | Yu | G09G 3/2092 |
| 2019/0156749 | A1* | 5/2019 | Wang | G09G 3/3233 |
| 2019/0156760 | A1* | 5/2019 | Noh | G09G 3/3233 |

FOREIGN PATENT DOCUMENTS

| | | | |
|---|---|---|---|
| KR | 100481491 | B1 | 4/2005 |
| KR | 1020210129310 | A | 10/2021 |

* cited by examiner

*Primary Examiner* — Sejoon Ahn
(74) *Attorney, Agent, or Firm* — CANTOR COLBURN LLP

(57) ABSTRACT

A display device includes a display panel divided into panel blocks including pixels, and a display panel driver which drives the display panel, sets a time point to which a set time elapses from a time point when input image data is determined to be a still image as an operation time point, decreases a luminance gain from the operation time point, determines the set time based on accumulated deterioration amounts of the panel blocks, and applies the luminance gain to the input image data.

17 Claims, 17 Drawing Sheets

| AGE_MIN | ST |
|---|---|
| 0 | 120[sec] |
| 10 | 100[sec] |
| 20 | 80[sec] |
| 30 | 60[sec] |
| 40 | 40[sec] |

FIG. 5B

| AGE_MAX | ST |
|---|---|
| 0 | 120[sec] |
| 10 | 100[sec] |
| 20 | 80[sec] |
| 30 | 60[sec] |
| 40 | 40[sec] |

FIG. 5C

| AGE_AVG | ST |
|---|---|
| 0 | 120[sec] |
| 10 | 100[sec] |
| 20 | 80[sec] |
| 30 | 60[sec] |
| 40 | 40[sec] |

| Number of AGE(AGE>TH_AGE1) | ST |
|---|---|
| 0 | 120[sec] |
| 10 | 115[sec] |
| 20 | 111[sec] |
| 30 | 107[sec] |
| 40 | 103[sec] |
| 50 | 99[sec] |
| 60 | 95[sec] |

TH_AGE1=5

| AGE_MIN | LG |
|---|---|
| 0 | 0.5 |
| 10 | 0.45 |
| 20 | 0.4 |
| 30 | 0.35 |
| 40 | 0.3 |

FIG. 8B

| AGE_MAX | LG |
|---|---|
| 0 | 0.5 |
| 10 | 0.45 |
| 20 | 0.4 |
| 30 | 0.35 |
| 40 | 0.3 |

FIG. 8C

| AGE_AVG | LG |
|---|---|
| 0 | 0.5 |
| 10 | 0.45 |
| 20 | 0.4 |
| 30 | 0.35 |
| 40 | 0.3 |

| Number of AGE(AGE>TH_AGE1) | LG |
|---|---|
| 0 | 0.5 |
| 10 | 0.48 |
| 20 | 0.47 |
| 30 | 0.45 |
| 40 | 0.43 |
| 50 | 0.41 |
| 60 | 0.4 |

AGE_TH1=5

FIG. 11A

| AGE_MIN | LG | ST |
|---|---|---|
| 0 | 0.5 | 120[sec] |
| 10 | 0.45 | 100[sec] |
| 20 | 0.4 | 80[sec] |
| 30 | 0.35 | 60[sec] |
| 40 | 0.3 | 40[sec] |

FIG. 11B

| AGE_MAX | LG | ST |
|---|---|---|
| 0 | 0.5 | 120[sec] |
| 10 | 0.45 | 100[sec] |
| 20 | 0.4 | 80[sec] |
| 30 | 0.35 | 60[sec] |
| 40 | 0.3 | 40[sec] |

FIG. 11C

| AGE_AVG | LG | ST |
|---|---|---|
| 0 | 0.5 | 120[sec] |
| 10 | 0.45 | 100[sec] |
| 20 | 0.4 | 80[sec] |
| 30 | 0.35 | 60[sec] |
| 40 | 0.3 | 40[sec] |

FIG. 11D

| Number of AGE(AGE>AGE_TH1) | LG | ST |
|---|---|---|
| 0 | 0.5 | 120[sec] |
| 10 | 0.48 | 115[sec] |
| 20 | 0.47 | 111[sec] |
| 30 | 0.45 | 107[sec] |
| 40 | 0.43 | 103[sec] |
| 50 | 0.41 | 99[sec] |
| 60 | 0.4 | 95[sec] |

AGE_TH1=5

DISPLAY DEVICE

This application claims priority to Korean Patent Application No. 10-2022-0093103, filed on Jul. 27, 2022, and all the benefits accruing therefrom under 35 U.S.C. § 119, the content of which in its entirety is herein incorporated by reference.

BACKGROUND

1. Field

Embodiments of the invention relate to a display device. More particularly, embodiments of the invention relate to a display device in which a luminance gain is applied.

2. Description of the Related Art

Generally, a display device may include a display panel, a timing controller, gate driver, and a data driver. The display panel may include a plurality of gate lines, a plurality of data lines, and a plurality of pixels electrically connected to the gate lines and the data lines. The gate driver may provide gate signals to the gate lines. The data driver may provide data voltages to the data lines. The timing controller may control the gate driver and the data driver.

SUMMARY

In an display device, as a driving time of the display device increases, the pixels may deteriorate. Also, as the pixels deteriorate, a lifetime of the pixels may decrease. Accordingly, the display device is desired to adjust a luminance of the pixels to reduce a rate at which the lifetime of the pixels is shortened.

Embodiments of the invention provide a display device in which a set time is determined based on accumulated deterioration amounts.

Embodiments of the invention also provide a display device in which a luminance gain is determined based on accumulated deterioration amounts.

According to embodiments of the invention, a display device includes a display panel divided into panel blocks including pixels, and a display panel driver which drives the display panel, sets a time point to which a set time elapses from a time point when input image data is determined to be a still image as an operation time point, decreases a luminance gain from the operation time point, determines the set time based on accumulated deterioration amounts of the panel blocks, and applies the luminance gain to the input image data.

In an embodiment, the set time may decrease as a minimum value of the accumulated deterioration amounts increases.

In an embodiment, the set time may decrease as a maximum value of the accumulated deterioration amounts increases.

In an embodiment, the set time may decrease as an average value of the accumulated deterioration amounts increases.

In an embodiment, the set time may decrease as a number of the accumulated deterioration amounts greater than a first reference deterioration amount increases.

In an embodiment, the display panel driver may determine the set time based on the accumulated deterioration amounts and a load of the input image data.

In an embodiment, the set time may decrease as the load increases.

In an embodiment, the display panel driver may determine the luminance gain based on the accumulated deterioration amounts.

According to embodiments of the invention, a display device includes a display panel divided into panel blocks including pixels, and a display panel driver which drives the display panel, sets a time point to which a set time elapses from a time point when input image data is determined to be a still image as an operation time point, decreases a luminance gain from the operation time point, determines the luminance gain based on accumulated deterioration amounts of the panel blocks, and applies the luminance gain to the input image data.

In an embodiment, the luminance gain may decrease as a minimum value of the accumulated deterioration amounts increases.

In an embodiment, the luminance gain may decrease as a maximum value of the accumulated deterioration amounts increases.

In an embodiment, the luminance gain may decrease as an average value of the accumulated deterioration amounts increases.

In an embodiment, the luminance gain may decrease as a number of the accumulated deterioration amounts greater than a first reference deterioration amount increases.

In an embodiment, the display panel driver may determine the luminance gain based on the accumulated deterioration amounts and a load of the input image data.

In an embodiment, the luminance gain may decrease as the load increases.

According to embodiments of the invention, a display device may include a display panel divided into panel blocks including pixels, and a display panel driver which drives the display panel, decreases a luminance gain as an motion amount of input image data increases, determines the luminance gain based on accumulated deterioration amounts of the panel blocks in a gain reduction region of the display panel, and applies the luminance gain to the input image data corresponding to the gain reduction region.

In an embodiment, the gain reduction region may be located at an outer part of the display panel.

In an embodiment, the luminance gain may decrease as a minimum value of the accumulated deterioration amounts increases.

In an embodiment, the luminance gain may decrease as a maximum value of the accumulated deterioration amounts increases.

In an embodiment, the luminance gain may decrease as an average value of the accumulated deterioration amounts increases.

In embodiments of invention, the display device may reduce a set time based on accumulated deterioration amounts by setting a time point to which the set time elapses from a time point when input image data is determined to be a still image as an operation time point, decreasing a luminance gain from the operation time point, determining the set time based on the accumulated deterioration amounts of the panel blocks, and applying the luminance gain to the input image data. Accordingly, the display device may rapidly reduce luminance.

In such embodiments, the display device may reduce a rate at which a lifetime of pixels is shortened and power consumption, and effectively prevent an afterimage by rapidly reducing luminance.

In such embodiments, the display device may reduce a luminance gain based on accumulated deterioration amounts by setting a time point to which a set time elapses from a time point when input image data is determined to be a still image as an operation time point, decreasing the luminance gain from the operation time point, determining the luminance gain based on the accumulated deterioration amounts of the panel blocks, and applying the luminance gain to the input image data

BRIEF DESCRIPTION OF THE DRAWINGS

FIG. 4 is a graph illustrating an example in which the display device of FIG. 1 adjusts a set time for adjusting a luminance gain based on accumulated deterioration amounts.

FIGS. 5A to 5D are tables illustrating an example in which the display device of FIG. 1 adjusts a set time for adjusting a luminance gain based on accumulated deterioration amounts.

FIG. 6 is a graph illustrating an example in which a display device according to embodiments of the invention adjusts a set time based on a load.

FIG. 7 is a graph illustrating an example in which a display device according to embodiments of the invention adjusts a luminance gain based on accumulated deterioration amounts.

FIGS. 8A to 8D are tables illustrating an example in which the display device of FIG. 7 adjusts a luminance gain based on accumulated deterioration amounts.

FIG. 9 is a graph illustrating an example in which a display device according to embodiments of the invention adjusts a luminance gain based on a load.

FIGS. 11A to 11D are tables illustrating an example in which a display device according to embodiments of the invention adjusts a set time and a luminance gain based on accumulated deterioration amounts.

DETAILED DESCRIPTION

Figure 1:
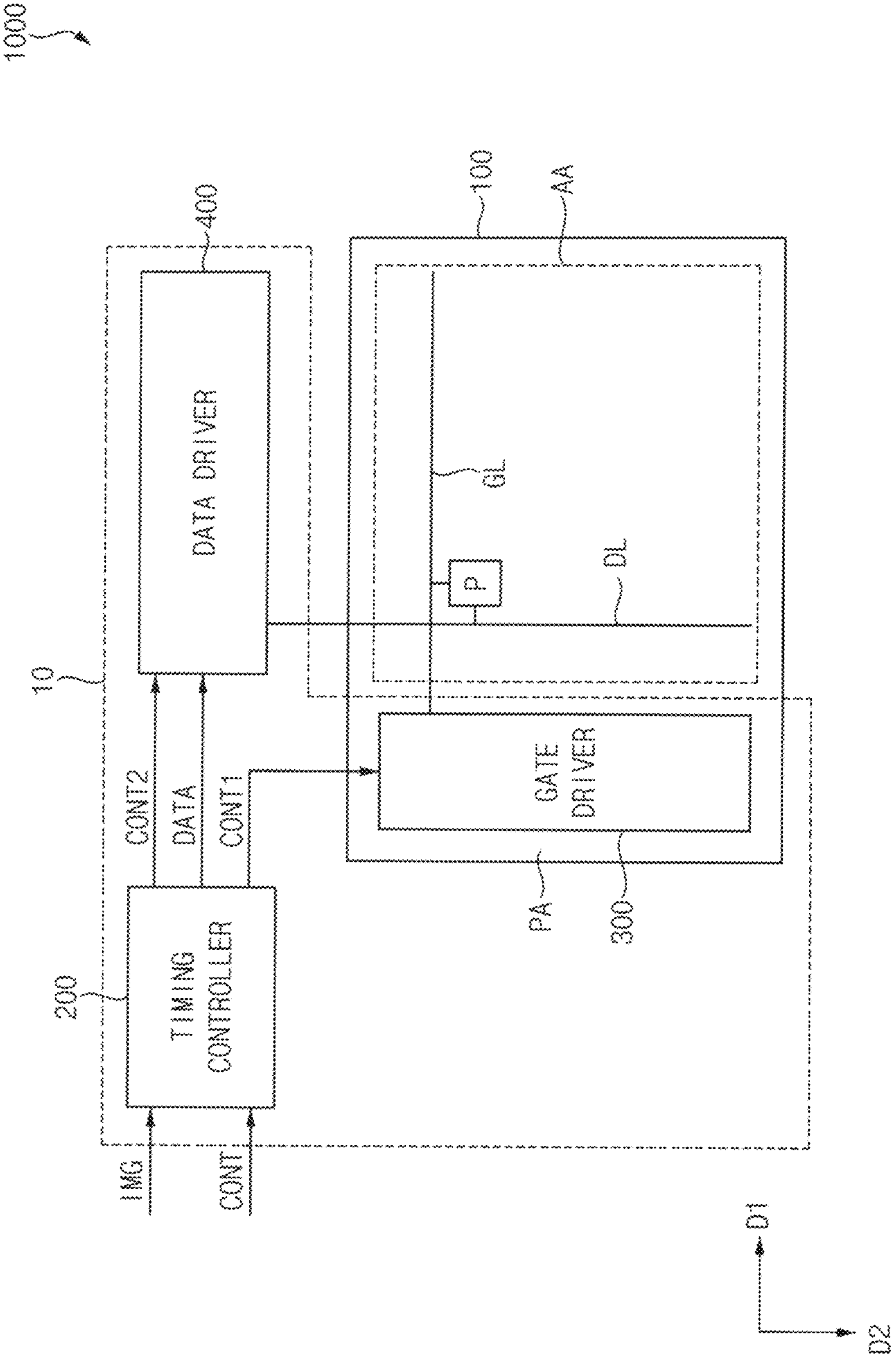
FIG. 1 is a block diagram illustrating a display device according to embodiments of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being “on” another element, it can be directly on the other element or intervening elements may be present therebetween. In contrast, when an element is referred to as being “directly on” another element, there are no intervening elements present.

It will be understood that, although the terms “first,” “second,” “third” etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, “a first element,” “component,” “region,” “layer” or “section” discussed below could be termed a second element, component, region, layer or section without departing from the teachings herein.

The terminology used herein is for the purpose of describing particular embodiments only and is not intended to be limiting. As used herein, “a”, “an,” “the,” and “at least one” do not denote a limitation of quantity, and are intended to include both the singular and plural, unless the context clearly indicates otherwise. For example, “an element” has the same meaning as “at least one element,” unless the context clearly indicates otherwise. “At least one” is not to be construed as limiting “a” or “an.” “Or” means “and/or.” As used herein, the term “and/or” includes any and all combinations of one or more of the associated listed items. It will be further understood that the terms “comprises” and/or “comprising,” or “includes” and/or “including” when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as “lower” or “bottom” and “upper” or “top,” may be used herein to describe one element’s relationship to another element as illustrated in the Figures. It will be understood that relative terms are intended to encompass different orientations of the device in addition to the orientation depicted in the Figures. For example, if the device in one of the figures is turned over, elements described as being on the “lower” side of other elements would then be oriented on “upper” sides of the other elements. The term “lower,” can therefore, encompasses both an orientation of “lower” and “upper,” depending on the particular orientation of the figure. Similarly, if the device in one of the figures is turned over, elements described as “below” or “beneath” other elements would then be oriented “above” the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

FIG. 1 is a block diagram illustrating a display device 1000 according to embodiments of the invention.

Referring to FIG. 1, an embodiment of the display device 1000 may include a display panel 100 and a display panel driver 10. The display panel driver 10 may include a timing controller 200, a gate driver 300, and a data driver 400. In an embodiment, the timing controller 200 and the data driver 400 may be integrated into one chip.

The display panel 100 has a display region AA on which an image is displayed and a peripheral region PA adjacent to the display region AA. In an embodiment, the gate driver 300 may be mounted on the peripheral region PA of the display panel 100.

The display panel 100 may include a plurality of gate lines GL, a plurality of data lines DL, and a plurality of pixels P electrically connected to the data lines DL and the gate lines GL. The gate lines GL may extend in a first direction D1 and the data lines DL may extend in a second direction D2 crossing the first direction D1.

The timing controller 200 may receive input image data IMG and an input control signal CONT from a host processor (e.g., a graphic processing unit (GPU)). In an embodiment, for example, the input image data IMG may include red image data, green image data and blue image data. In an embodiment, the input image data IMG may further include white image data. In an alternative embodiment, for example, the input image data IMG may include magenta image data, yellow image data, and cyan image data. The input control signal CONT may include a master clock signal and a data enable signal. The input control signal CONT may further include a vertical synchronizing signal and a horizontal synchronizing signal.

The timing controller 200 may generate a first control signal CONT1, a second control signal CONT2, and data signal DATA based on the input image data IMG and the input control signal CONT.

The timing controller 200 may generate the first control signal CONT1 for controlling operation of the gate driver 300 based on the input control signal CONT and output the first control signal CONT1 to the gate driver 300. The first control signal CONT1 may include a vertical start signal and a gate clock signal.

The timing controller 200 may generate the second control signal CONT2 for controlling operation of the data driver 400 based on the input control signal CONT and output the second control signal CONT2 to the data driver 400. The second control signal CONT2 may include a horizontal start signal and a load signal.

The timing controller 200 may receive the input image data IMG and the input control signal CONT, and generate the data signal DATA based on the input image data IMG and the input control signal CONT. The timing controller 200 may output the data signal DATA to the data driver 400.

The gate driver 300 may generate gate signals for driving the gate lines GL in response to the first control signal CONT1 input from the timing controller 200. The gate driver 300 may output the gate signals to the gate lines GL. In an embodiment, for example, the gate driver 300 may sequentially output the gate signals to the gate lines GL.

The data driver 400 may receive the second control signal CONT2 and the data signal DATA from the timing controller 200. The data driver 400 may convert the data signal DATA into data voltages having an analog type. The data driver 400 may output the data voltages to the data lines DL.

Figure 2:
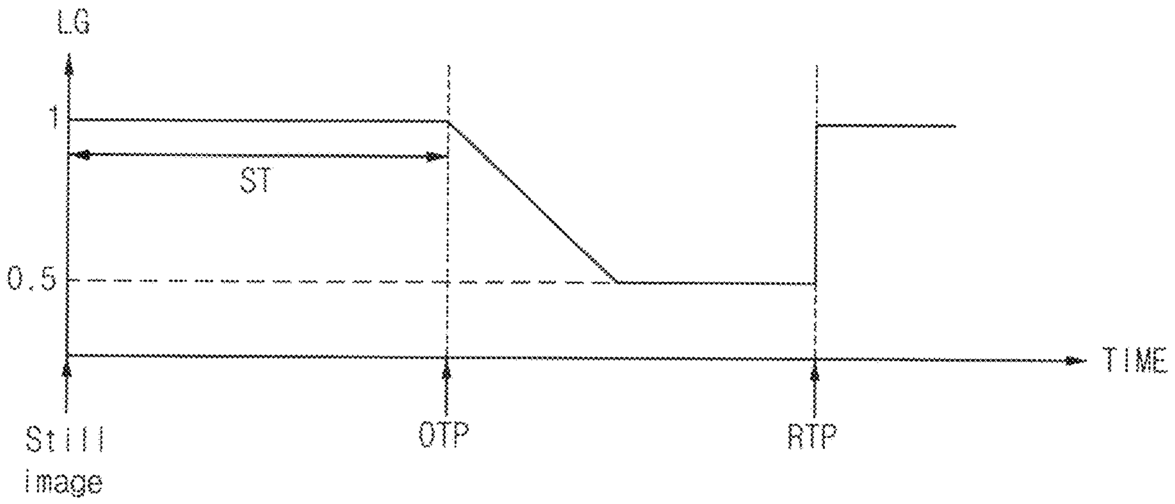
FIG. 2 is a graph illustrating an embodiment in which the display device of FIG. 1 adjusts a luminance gain based on a still image.

FIG. 2 is a graph illustrating an example in which the display device 1000 of FIG. 1 adjusts a luminance gain LG according to a still image.

Referring to FIGS. 1 and 2, the timing controller 200 may set a time point when (to which) a set time ST elapses from a time point when (at which) the input image data IMG is determined to be the still image as an operation time point OTP, and decrease the luminance gain LG from the operation time point OTP. The set time ST may be a set time for the timing controller 200 to adjust the luminance gain LG.

In an embodiment, for example, in a case of a still image, grayscale values of the input image data IMG continuous in frame units may be substantially the same as each other. In an embodiment, for example, in a case of a moving image, grayscale values of the input image data IMG continuous in frame units may be substantially different from each other.

The timing controller 200 may apply the luminance gain LG to the input image data IMG to generate the data signal DATA. The luminance gain LG may be a value of 0 or greater and 1 or less. In an embodiment, for example, when the luminance gain LG of 1 is applied to the input image data IMG, a luminance of a displayed image may not change (i.e., 1 times). In an embodiment, for example, when the luminance gain LG of 0.5 is applied to the input image data IMG, a luminance of a displayed image may be halved (i.e., 0.5 times).

The timing controller 200 may maintain the luminance gain LG for the set time ST. The timing controller 200 may decrease the luminance gain LG from the operation time point OTP. In an embodiment, the timing controller 200 may decrease the luminance gain LG from the operation time point OTP to a saturation level. In an embodiment, for example, as shown in FIG. 2, when the saturation level is 0.5, the luminance gain LG may be reduced to 0.5.

The timing controller 200 may return the luminance gain LG to an initial level (i.e., 1) at a reset time point RTP. The reset time point RTP may be a time point at which it is determined that the input image data IMG is no longer the still image.

In such an embodiment, as described above, when the still image is displayed, the display device 1000 may effectively prevent an afterimage caused by the still image and reduce power consumption by lowering the luminance of the image.

Figure 3:
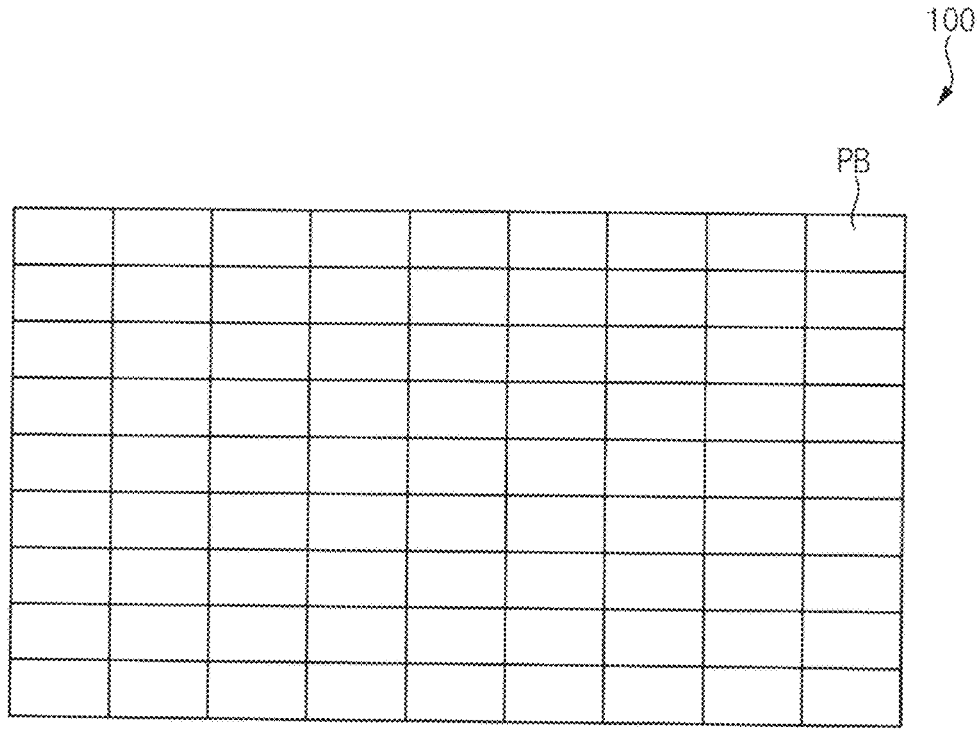
FIG. 3 is a diagram illustrating an example of a display panel of the display device of FIG. 1.
Figures 4, 5A:
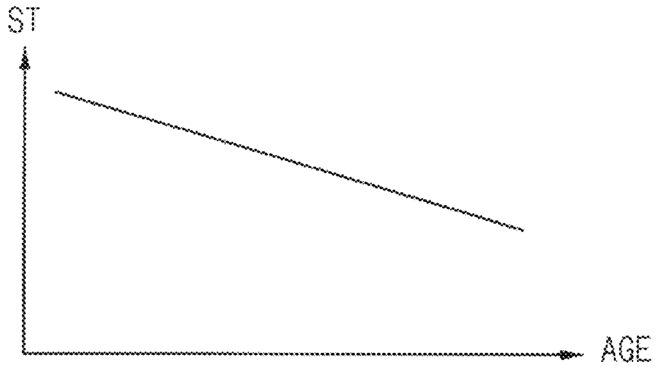

FIG. 3 is a diagram illustrating an example of the display panel 100 of the display device 1000 of FIG. 1, FIG. 4 is a graph illustrating an example in which the display device 1000 of FIG. 1 adjusts the set time ST for adjusting the luminance gain LG based on accumulated deterioration amounts AGE, and FIGS. 5A to 5D are tables illustrating an example in which the display device 1000 of FIG. 1 adjusts the set time ST for adjusting the luminance gain LG based on the accumulated deterioration amounts AGE. The accumulated deterioration amounts AGE may be relative values.

Referring to FIGS. 1, 3, and 4, in an embodiment, the display panel 100 may be divided into panel blocks PB including the pixels P. The timing controller 200 may generate the accumulated deterioration amounts AGE of the panel blocks PB.

The timing controller 200 may generate the accumulated deterioration amount AGE of each of the panel blocks PB based on a deterioration stress accumulated in the display panel 100. In an embodiment, the timing controller 200 may accumulate and store the deterioration stress of the display panel 100 in a nonvolatile memory device, and may generate the accumulated deterioration amounts AGE corresponding to the accumulated deterioration stress. The timing controller 200 may consider various factors that generate deterioration stress when calculating the accumulated deterioration amounts AGE. In an embodiment, for example, the timing controller 200 may accumulate the deterioration stress in consideration of various factors such as temperature data, position data of the panel blocks PB, the number of light emission, a light emission period, or the like, and may generate the accumulated deterioration amount AGE of each of the panel blocks PB based on the deterioration stress. The large value of the accumulated deterioration amount AGE may mean that the deterioration stress of the panel block PB is large. That is, the large value of the accumulated deterioration amount AGE may mean that an accumulated usage amount of the panel block PB is large.

Referring to FIGS. 1, 3, 4, 5A, 5B, 5C, and 5D, the timing controller 200 may determine the set time ST based on the accumulated deterioration amounts AGE of the panel blocks PB. As shown in FIG. 4, as the accumulated deterioration amounts AGE of the panel blocks PB increase, the set time ST may be shortened. The accumulated deterioration amounts AGE of FIG. 4 may be one of a minimum value AGE_MIN of the accumulated deterioration amounts AGE, a maximum value AGE_MAX of the accumulated deterioration amounts AGE, an average value AGE_AVG of the accumulated deterioration amounts AGE, and the number of the accumulated deterioration amounts AGE greater than a first reference deterioration amount TH_AGE1.

In an embodiment, as shown in FIG. 5A, the set time ST may decrease (become shorter) as the minimum value AGE_MIN of the accumulated deterioration amounts AGE increases. In an embodiment, for example, when the minimum value AGE_MIN of the accumulated deterioration amounts AGE is 0, the set time ST may be 120 seconds (sec). In an embodiment, for example, when the minimum value AGE_MIN of the accumulated deterioration amounts AGE is 10, the set time ST may be 100 sec. In an embodiment, for example, when the minimum value AGE_MIN of the accumulated deterioration amounts AGE is 20, the set time ST may be 80 sec. In an embodiment, for example, when the minimum value AGE_MIN of the accumulated deterioration amounts AGE is 30, the set time ST may be 60 sec. In an embodiment, for example, when the minimum value AGE_MIN of the accumulated deterioration amounts AGE is 40, the set time ST may be 40 sec.

In an embodiment, as shown in FIG. 5B, the set time ST may decrease (become shorter) as the maximum value AGE_MAX of the accumulated deterioration amounts AGE increases. In an embodiment, for example, when the maximum value AGE_MAX of the accumulated deterioration amounts AGE is 0, the set time ST may be 120 sec. In an embodiment, for example, when the maximum value AGE_MAX of the accumulated deterioration amounts AGE is 10, the set time ST may be 100 sec. In an embodiment, for example, when the maximum value AGE_MAX of the accumulated deterioration amounts AGE is 20, the set time ST may be 80 sec. In an embodiment, for example, when the maximum value AGE_MAX of the accumulated deterioration amounts AGE is 30, the set time ST may be 60 sec. In an embodiment, for example, when the maximum value AGE_MAX of the accumulated deterioration amounts AGE is 40, the set time ST may be 40 sec.

In an embodiment, as shown in FIG. 5C, the set time ST may decrease (become shorter) as the average value AGE_AVG of the accumulated deterioration amounts AGE increases. In an embodiment, for example, when the average value AGE_AVG of the accumulated deterioration amounts AGE is 0, the set time ST may be 120 sec. In an embodiment, for example, when the average value AGE_AVG of the accumulated deterioration amounts AGE is 10, the set time ST may be 100 sec. In an embodiment, for example, when the average value AGE_AVG of the accumulated deterioration amounts AGE is 20, the set time ST may be 80 sec. In an embodiment, for example, when the average value AGE_AVG of the accumulated deterioration amounts AGE is 30, the set time ST may be 60 sec. In an embodiment, for example, when the average value AGE_AVG of the accumulated deterioration amounts AGE is 40, the set time ST may be 40 sec.

Figures 5D, 6:
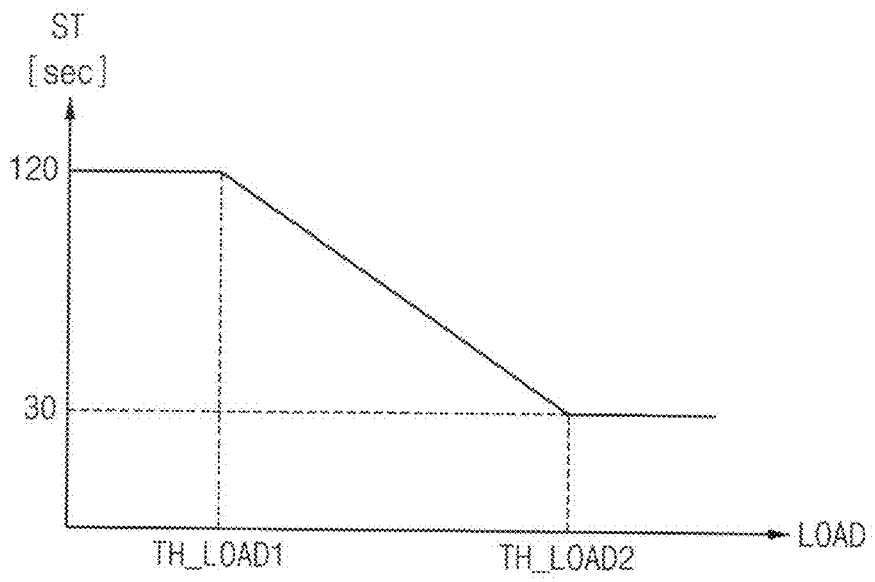

In an embodiment, as shown in FIG. 5D, the set time ST may decrease (become shorter) as the number of the accumulated deterioration amounts AGE greater than the first reference deterioration amount TH_AGE1 increases. In an embodiment, for example, when the first reference deterioration amount TH_AGE1 is 5 and the number of the accumulated deterioration amounts AGE greater than 5 is 0, the set time ST may be 120 sec. In an embodiment, for example, when the first reference deterioration amount TH_AGE1 is 5 and the number of the accumulated deterioration amounts AGE greater than 5 is 10, the set time ST may be 115 sec. In an embodiment, for example, when the first reference deterioration amount TH_AGE1 is 5 and the number of the accumulated deterioration amounts AGE greater than 5 is 20, the set time ST may be 111 sec. In an embodiment, for example, when the first reference deterioration amount TH_AGE1 is 5 and the number of the accumulated deterioration amounts AGE greater than 5 is 30, the set time ST may be 107 sec. In an embodiment, for example, when the first reference deterioration amount TH_AGE1 is 5 and the number of the accumulated deterioration amounts AGE greater than 5 is 40, the set time ST may be 103 sec. In an embodiment, for example, when the first reference deterioration amount TH_AGE1 is 5 and the number of the accumulated deterioration amounts AGE greater than 5 is 50, the set time ST may be 99 sec. In an embodiment, for example, when the first reference deterioration amount TH_AGE1 is 5 and the number of the accumulated deterioration amounts AGE greater than 5 is 60, the set time ST may be 95 sec. Here, the first reference deterioration amount TH_AGE1 may be a preset value.

FIG. 6 is a graph illustrating an example in which a display device according to embodiments of the invention adjusts the set time based on a load LOAD. FIG. 6 shows that the set time ST determined based on the accumulated deterioration amounts AGE is 120 sec.

Referring to FIGS. 1 and 6, in an embodiment, the display device of FIG. 6 may determine the set time ST based on the accumulated deterioration amounts AGE and the load LOAD of the input image data IMG.

The load LOAD may be normalized to have a value from 0% to 100%. In an embodiment, for example, when the input image data IMG is a full white image, the load LOAD may be 100%. In an embodiment, for example, when the input image data IMG is a full black image, the load LOAD may be 0%.

In an embodiment, the timing controller 200 may maintain the set time ST when the load LOAD is less than or equal to a first reference load TH_LOAD1. The timing controller 200 may reduce the set time ST when the load LOAD is greater than the first reference load TH_LOAD1 and less than or equal to a second reference load TH_LOAD2. The timing controller 200 may maintain the set time ST when the load LOAD is greater than the second reference load TH_LOAD2. Accordingly, the display device may effectively prevent an afterimage and reduce power consumption by rapidly reducing the luminance based on the load LOAD. The first reference load TH_LOAD1 and the second reference load TH_LOAD2 may be preset values.

Figures 7, 8A:
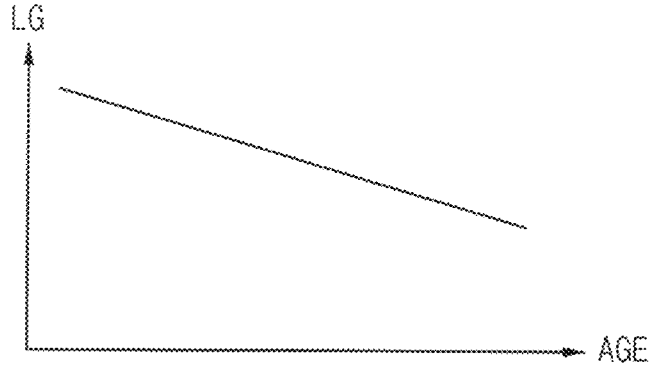

FIG. 7 is a graph illustrating an example in which a display device according to embodiments of the invention adjusts the luminance gain LG based on the accumulated deterioration amounts AGE. FIGS. 8A to 8D are tables illustrating an example in which the display device of FIG. 7 adjusts the luminance gain LG based on the accumulated deterioration amounts AGE. FIGS. 8A to 8D show that the luminance gain LG is the saturation level of FIG. 2.

Figures 8D, 9:
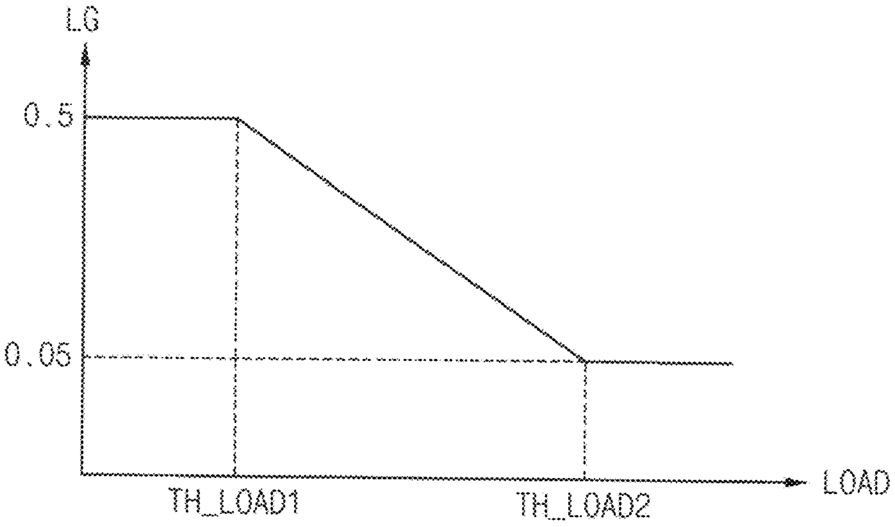

The embodiment of the display device shown in FIGS. 7 to 8D is substantially the same as the embodiment of the display device 1000 described above with reference to FIGS. 1 to 5C except for adjusting the luminance gain LG instead of the set time ST. Thus, the same reference numerals are used to refer to the same or similar elements, and any repetitive detailed description thereof will be omitted.

Referring to FIGS. 1, 3, 7, 8A, 8B, 8C, and 8D, in an embodiment, the timing controller 200 may determine the luminance gain LG based on the accumulated deterioration amounts AGE of the panel blocks PB. As shown in FIG. 7, as the accumulated deterioration amounts AGE of the panel blocks PB increase, the luminance gain LG may decrease. The accumulated deterioration amounts AGE of FIG. 7 may be one of a minimum value AGE_MIN of the accumulated deterioration amounts AGE, a maximum value AGE_MAX of the accumulated deterioration amounts AGE, an average value AGE_AVG of the accumulated deterioration amounts AGE, and the number of the accumulated deterioration amounts AGE greater than a first reference deterioration amount TH_AGE1.

In an embodiment, as shown in FIG. 8A, the luminance gain LG may decrease as the minimum value AGE_MIN of the accumulated deterioration amounts AGE increases. In an embodiment, for example, when the minimum value AGE_MIN of the accumulated deterioration amounts AGE is 0, the luminance gain LG may be 0.5. In an embodiment, for example, when the minimum value AGE_MIN of the accumulated deterioration amounts AGE is 10, the luminance gain LG may be 0.45. In an embodiment, for example, when the minimum value AGE_MIN of the accumulated deterioration amounts AGE is 20, the luminance gain LG may be 0.4. In an embodiment, for example, when the minimum value AGE_MIN of the accumulated deterioration amounts AGE is 30, the luminance gain LG may be 0.35. In an embodiment, for example, when the minimum value AGE_MIN of the accumulated deterioration amounts AGE is 40, the luminance gain LG may be 0.3.

In an embodiment, as shown in FIG. 8B, the luminance gain LG may decrease as the maximum value AGE_MAX of the accumulated deterioration amounts AGE increases. In an embodiment, for example, when the maximum value AGE_MAX of the accumulated deterioration amounts AGE is 0, the luminance gain LG may be 0.5. In an embodiment, for example, when the maximum value AGE_MAX of the accumulated deterioration amounts AGE is 10, the luminance gain LG may be 0.45. In an embodiment, for example, when the maximum value AGE_MAX of the accumulated deterioration amounts AGE is 20, the luminance gain LG may be 0.4. In an embodiment, for example, when the maximum value AGE_MAX of the accumulated deterioration amounts AGE is 30, the luminance gain LG may be 0.35. In an embodiment, for example, when the maximum value AGE_MAX of the accumulated deterioration amounts AGE is 40, the luminance gain LG may be 0.3.

In an embodiment, as shown in FIG. 8C, the luminance gain LG may decrease as the average value AGE_AVG of the accumulated deterioration amounts AGE increases. In an embodiment, for example, when the average value AGE_AVG of the accumulated deterioration amounts AGE is 0, the luminance gain LG may be 0.5. In an embodiment, for example, when the average value AGE_AVG of the accumulated deterioration amounts AGE is 10, the luminance gain LG may be 0.45. In an embodiment, for example, when the average value AGE_AVG of the accumulated deterioration amounts AGE is 20, the luminance gain LG may be 0.4. In an embodiment, for example, when the average value AGE_AVG of the accumulated deterioration amounts AGE is 30, the luminance gain LG may be 0.35. In an embodiment, for example, when the average value AGE_AVG of the accumulated deterioration amounts AGE is 40, the luminance gain LG may be 0.3.

In an embodiment, as shown in FIG. 8D, the luminance gain LG may decrease as the number of the accumulated deterioration amounts AGE greater than the first reference deterioration amount TH_AGE1 increases. In an embodiment, for example, when the first reference deterioration amount TH_AGE1 is 5 and the number of the accumulated deterioration amounts AGE greater than 5 is 0, the luminance gain LG may be 0.5. In an embodiment, for example, when the first reference deterioration amount TH_AGE1 is 5 and the number of the accumulated deterioration amounts AGE greater than 5 is 10, the luminance gain LG may be 0.48. In an embodiment, for example, when the first reference deterioration amount TH_AGE1 is 5 and the number of the accumulated deterioration amounts AGE greater than 5 is 20, the luminance gain LG may be 0.47. In an embodiment, for example, when the first reference deterioration amount TH_AGE1 is 5 and the number of the accumulated deterioration amounts AGE greater than 5 is 30, the luminance gain LG may be 0.45. In an embodiment, for example, when the first reference deterioration amount TH_AGE1 is 5 and the number of the accumulated deterioration amounts AGE greater than 5 is 40, the luminance gain LG may be 0.43. In an embodiment, for example, when the first reference deterioration amount TH_AGE1 is 5 and the number of the accumulated deterioration amounts AGE greater than 5 is 50, the luminance gain LG may be 0.41. In an embodiment, for example, when the first reference deterioration amount TH_AGE1 is 5 and the number of the accumulated deterioration amounts AGE greater than 5 is 60, the luminance gain LG may be 0.4. Here, the first reference deterioration amount TH_AGE1 may be a preset value.

Figure 10:
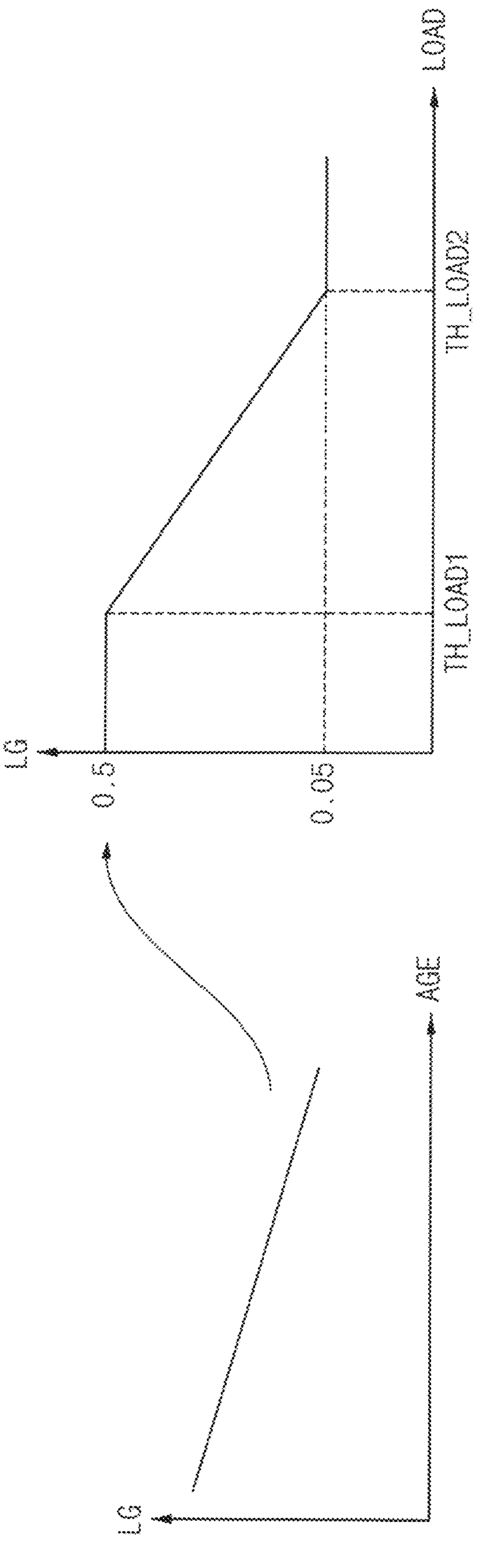
FIG. 10 is a graph illustrating an example in which the display device of FIG. 9 adjusts a luminance gain based on a load and accumulated deterioration amounts.

FIG. 9 is a graph illustrating an example in which a display device according to embodiments of the invention adjusts the luminance gain LG based on the load LOAD, and FIG. 10 is a graph illustrating an example in which the display device of FIG. 9 adjusts the luminance gain LG based on the load LOAD and the accumulated deterioration amounts AGE.

The embodiment of the display device shown in FIGS. 9 and 10 is substantially the same as the embodiment of the display device described above with reference to FIGS. 6 and 7 except for determining the luminance gain LG based on the load LOAD of the input image data IMG as well as the accumulated deterioration amounts AGE. Thus, the same reference numerals are used to refer to the same or similar elements, and any repetitive detailed description thereof will be omitted.

Referring to FIGS. 1, 9, and 10, in an embodiment, the display device may determine the luminance gain LG based on the accumulated deterioration amounts AGE and the load LOAD of the input image data IMG. The luminance gain LG may decrease as the load LOAD increases.

In an embodiment, the timing controller 200 may maintain the luminance gain LG when the load LOAD is less than or equal to a first reference load TH_LOAD1. The timing controller 200 may reduce the luminance gain LG when the load LOAD is greater than the first reference load TH_LOAD1 and less than or equal to a second reference load TH_LOAD2. The timing controller 200 may maintain the luminance gain LG when the load LOAD is greater than the second reference load TH_LOAD2. Accordingly, the display device may effectively prevent an afterimage and reduce power consumption by rapidly reducing the luminance based on the load LOAD.

FIGS. 11A to 11D are tables illustrating an example in which a display device according to embodiments of the invention adjusts the set time ST and the luminance gain LG based on the accumulated deterioration amounts AGE. FIGS. 11A to 11D show that the luminance gain LG is the saturation level of FIG. 2.

The embodiment of the display device shown in FIGS. 11A to 11D is substantially the same as the embodiments of the display device 1000 described above except for adjusting the set time ST and the luminance gain LG based on the accumulated deterioration amounts AGE. Thus, the same reference numerals are used to refer to the same or similar elements, and any repetitive detailed description thereof will be omitted.

Referring to FIGS. 1, 3, 4, 7, 11A, 11B, 11C, and 11D, in an embodiment, the timing controller 200 may determine the set time ST and the luminance gain LG based on the accumulated deterioration amounts AGE of the panel blocks PB.

In an embodiment, as shown in FIG. 11A, the luminance gain LG and the set time ST may decrease as the minimum value AGE_MIN of the accumulated deterioration amounts AGE increases. In an embodiment, for example, when the minimum value AGE_MIN of the accumulated deterioration amounts AGE is 0, the set time ST may be 120 sec and the luminance gain LG may be 0.5. In an embodiment, for example, when the minimum value AGE_MIN of the accumulated deterioration amounts AGE is 10, the set time ST may be 100 sec and the luminance gain LG may be 0.45. In an embodiment, for example, when the minimum value AGE_MIN of the accumulated deterioration amounts AGE is 20, the set time ST may be 80 sec and the luminance gain LG may be 0.4. In an embodiment, for example, when the minimum value AGE_MIN of the accumulated deterioration amounts AGE is 30, the set time ST may be 60 sec and the luminance gain LG may be 0.35. In an embodiment, for example, when the minimum value AGE_MIN of the accumulated deterioration amounts AGE is 40, the set time ST may be 40 sec and the luminance gain LG may be 0.3.

In an embodiment, as shown in FIG. 11B, the luminance gain LG and the set time ST may decrease as the maximum value AGE_MAX of the accumulated deterioration amounts AGE increases. In an embodiment, for example, when the maximum value AGE_MAX of the accumulated deterioration amounts AGE is 0, the set time ST may be 120 sec and the luminance gain LG may be 0.5. In an embodiment, for example, when the maximum value AGE_MAX of the accumulated deterioration amounts AGE is 10, the set time ST may be 100 sec and the luminance gain LG may be 0.45. In an embodiment, for example, when the maximum value AGE_MAX of the accumulated deterioration amounts AGE is 20, the set time ST may be 80 sec and the luminance gain LG may be 0.4. In an embodiment, for example, when the maximum value AGE_MAX of the accumulated deterioration amounts AGE is 30, the set time ST may be 60 sec and the luminance gain LG may be 0.35. In an embodiment, for example, when the maximum value AGE_MAX of the accumulated deterioration amounts AGE is 40, the set time ST may be 40 sec and the luminance gain LG may be 0.3.

In an embodiment, as shown in FIG. 11C, the luminance gain LG and the set time ST may decrease as the average value AGE_AVG of the accumulated deterioration amounts AGE increases. In an embodiment, for example, when the average value AGE_AVG of the accumulated deterioration amounts AGE is 0, the set time ST may be 120 sec and the luminance gain LG may be 0.5. In an embodiment, for example, when the average value AGE_AVG of the accumulated deterioration amounts AGE is 10, the set time ST may be 100 sec and the luminance gain LG may be 0.45. In an embodiment, for example, when the average value AGE_AVG of the accumulated deterioration amounts AGE is 20, the set time ST may be 80 sec and the luminance gain LG may be 0.4. In an embodiment, for example, when the average value AGE_AVG of the accumulated deterioration amounts AGE is 30, the set time ST may be 60 sec and the luminance gain LG may be 0.35. In an embodiment, for example, when the average value AGE_AVG of the accumulated deterioration amounts AGE is 40, the set time ST may be 40 sec and the luminance gain LG may be 0.3.

In an embodiment, as shown in FIG. 11D, the luminance gain LG and the set time ST may decrease as the number of the accumulated deterioration amounts AGE greater than the first reference deterioration amount TH_AGE1 increases. In an embodiment, for example, when the first reference deterioration amount TH_AGE1 is 5 and the number of the accumulated deterioration amounts AGE greater than 5 is 0, the set time ST may be 120 sec and the luminance gain LG may be 0.5. In an embodiment, for example, when the first reference deterioration amount TH_AGE1 is 5 and the number of the accumulated deterioration amounts AGE greater than 5 is 10, the set time ST may be 115 sec and the luminance gain LG may be 0.48. In an embodiment, for example, when the first reference deterioration amount TH_AGE1 is 5 and the number of the accumulated deterioration amounts AGE greater than 5 is 20, the set time ST may be 111 sec and the luminance gain LG may be 0.47. In an embodiment, for example, when the first reference deterioration amount TH_AGE1 is 5 and the number of the accumulated deterioration amounts AGE greater than 5 is 30, the set time ST may be 107 sec and the luminance gain LG may be 0.45. In an embodiment, for example, when the first reference deterioration amount TH_AGE1 is 5 and the number of the accumulated deterioration amounts AGE greater than 5 is 40, the set time ST may be 103 sec and the luminance gain LG may be 0.43. In an embodiment, for example, when the first reference deterioration amount TH_AGE1 is 5 and the number of the accumulated deterioration amounts AGE greater than 5 is 50, the set time ST may be 99 sec and the luminance gain LG may be 0.41. In an embodiment, for example, when the first reference deterioration amount TH_AGE1 is 5 and the number of the accumulated deterioration amounts AGE greater than 5 is 60, the set time ST may be 95 sec and the luminance gain LG may be 0.4. Here, the first reference deterioration amount TH_AGE1 may be a preset value.

Figure 12:
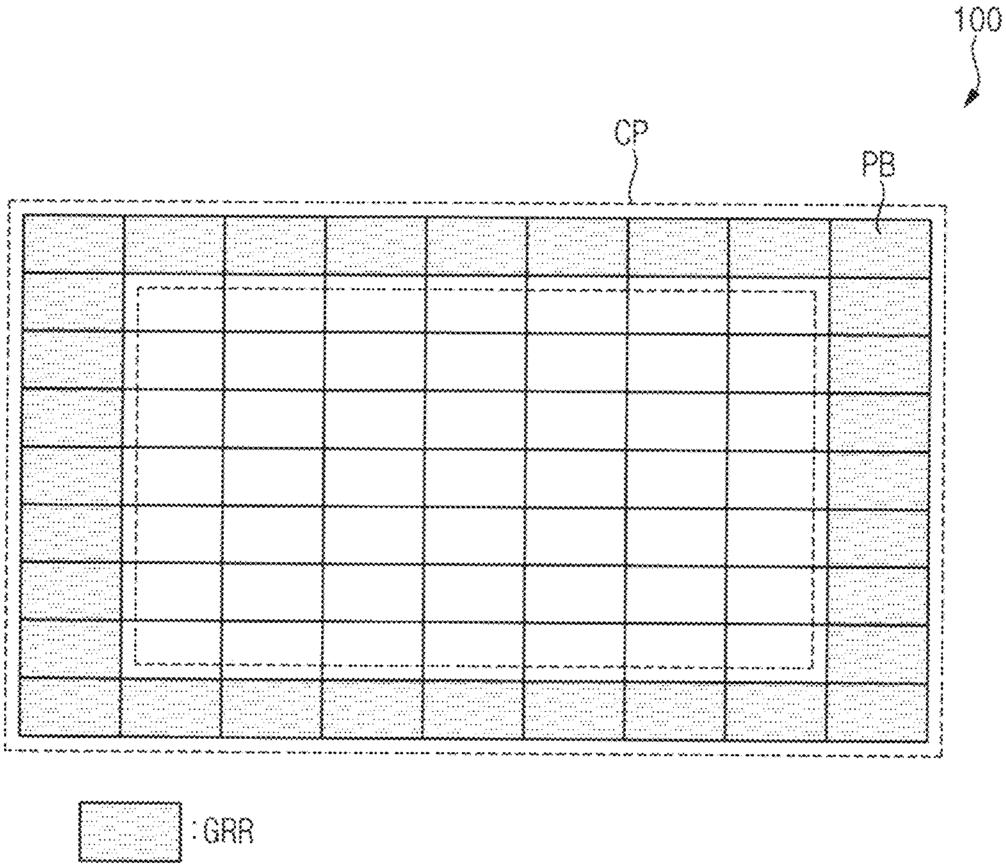
FIG. 12 is a diagram illustrating an example of a display panel of a display device according to embodiments of the invention.
Figure 13:
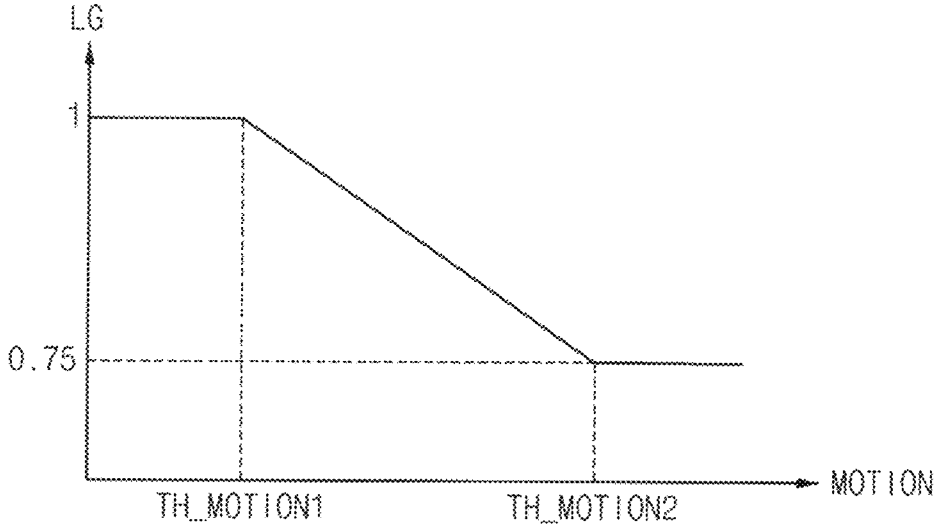
FIG. 13 is a graph illustrating an example in which the display device of FIG. 12 adjusts a luminance gain based on a motion amount of input image data.
Figure 14:
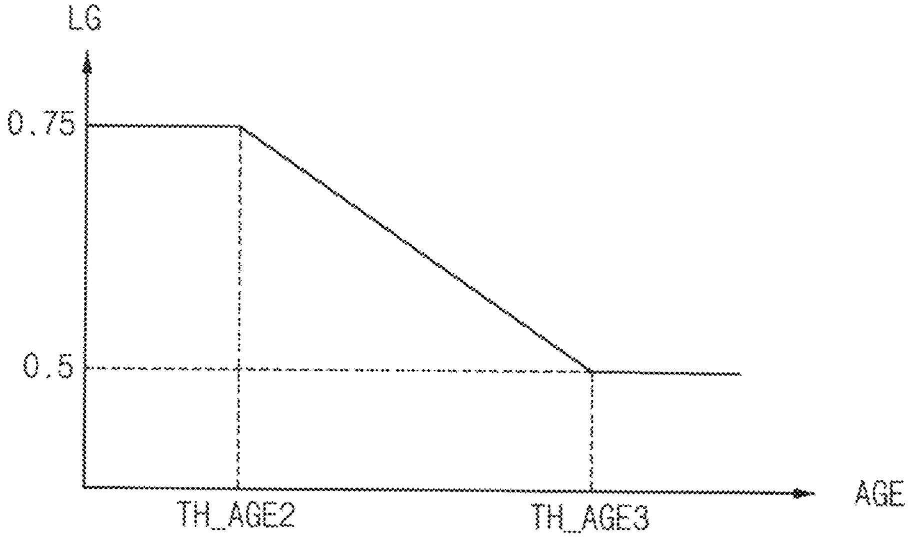
FIG. 14 is a graph illustrating an example in which the display device of FIG. 12 adjusts a luminance gain based on accumulated deterioration amounts.
Figure 15:
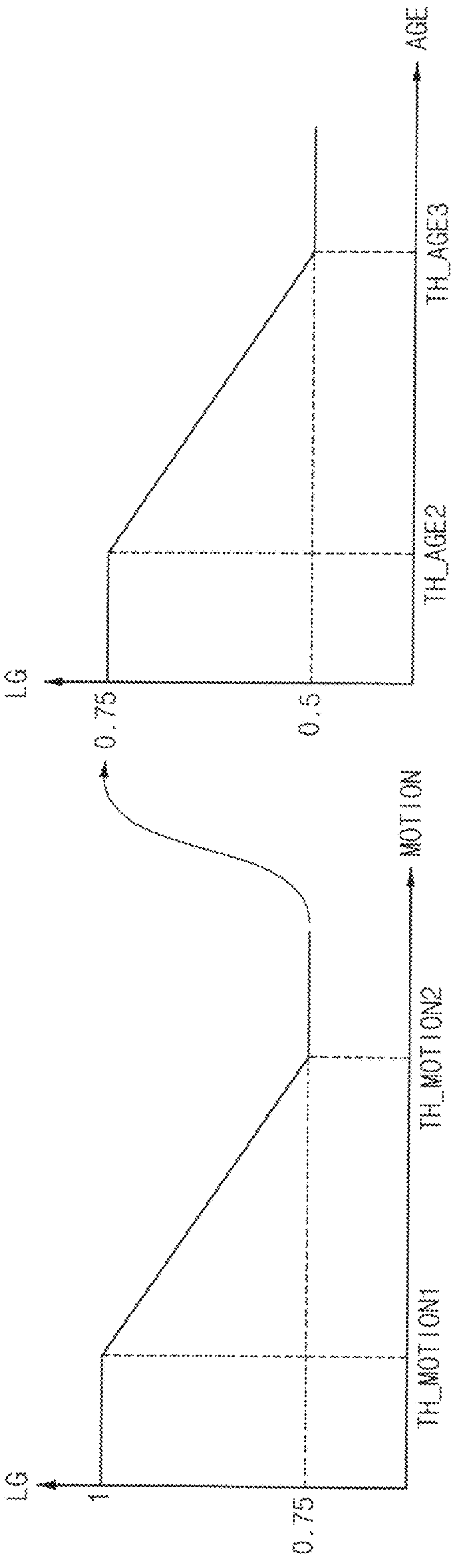
FIG. 15 is a graph illustrating an example in which the display device of FIG. 12 adjusts a luminance gain based on a motion amount of input image data and accumulated deterioration amounts.

FIG. 12 is a diagram illustrating an example of the display panel 100 of a display device according to embodiments of the invention, FIG. 13 is a graph illustrating an example in which the display device of FIG. 12 adjusts the luminance gain LG based on a motion amount MOTION of the input image data IMG, FIG. 14 is a graph illustrating an example in which the display device of FIG. 12 adjusts the luminance gain LG based on the accumulated deterioration amounts AGE, and FIG. 15 is a graph illustrating an example in which the display device of FIG. 12 adjusts the luminance gain based on the motion amount MOTION of the input image data IMG and the accumulated deterioration amounts AGE. The accumulated deterioration amounts AGE of FIG. 14 represent the accumulated deterioration amounts AGE of the panel blocks PB of a gain reduction region GRR. FIG. 15 shows that the luminance gain LG determined based on the motion amount MOTION is 0.75.

The embodiments of the display device shown in FIGS. 12 to 15 is substantially the same as the embodiments of the display device 1000 described above except for adjusting the luminance gain LG based on the motion amount MOTION and applying the luminance gain LG to the gain reduction region GRR. Thus, the same reference numerals are used to refer to the same or similar elements, and any repetitive detailed description thereof will be omitted.

Referring to FIGS. 1, and 12 to 15, in an embodiment, the timing controller 200 may decrease the luminance gain LG as the motion amount MOTION of the input image data IMG increases, determine the luminance gain LG based on the accumulated deterioration amounts AGE of the panel blocks PB in the gain reduction region GRR of the display panel 100, and apply the luminance gain LG to the input image data IMG corresponding to the gain reduction region GRR. In an embodiment, for example, the input image data IMG corresponding to the gain reduction region GRR may be a part of the input image data IMG for an image displayed in the gain reduction region GRR.

The gain reduction region GRR may be located at an outer part CP of the display panel 100. In an embodiment, for example, the outer part CP of the display panel 100 may include the outermost panel blocks PB of the display panel 100. However, the outer part CP of the display panel 100 is not limited thereto.

The luminance of the outer part CP of the display panel 100 may be bright due to the peripheral region PA that does not display an image. Accordingly, the luminance of the outer part CP of the display panel 100 may be reduced by setting the outer part CP of the display panel 100 as the gain reduction region GRR and applying the luminance gain LG to the gain reduction region GRR.

The motion amount MOTION of the input image data IMG of a current frame may be a sum of a difference between the input image data IMG of a previous frame and the input image data IMG of the current frame. In an embodiment, for example, the motion amount MOTION of the input image data IMG of the current frame may be a sum of differences between grayscale values of the input image data IMG of the previous frame and grayscale values of the input image data IMG of the current frame. In an alternative embodiment, for example, the motion amount MOTION of the input image data IMG of the current frame may be a difference between a sum of the grayscale values of the input image data IMG of the previous frame and a sum of the grayscale values of the input image data IMG of the current frame.

When a motion of the image is large, attention may be focused on the motion. Accordingly, even when the small luminance gain LG is applied, a darkening of the outer part CP may not be visually recognized. Conversely, when the motion of the image is small, the darkening of the outer part CP may be relatively more recognizable than when the motion of the image is large. Accordingly, it may be desirable for the display device 1000 to apply the larger luminance gain LG when the motion of the image is relatively small than when the motion of the image is relatively large.

Referring to FIGS. 1, 12, and 13, the timing controller 200 may maintain the luminance gain LG when the motion amount MOTION is less than or equal to a first reference motion amount TH_MOTION1. The timing controller 200 may decrease the luminance gain LG when the motion amount MOTION is greater than the first reference motion amount TH_MOTION1 and less than or equal to a second reference motion amount TH_MOTION2. The timing controller 200 may maintain the luminance gain LG when the motion amount MOTION is greater than the second reference motion amount TH_MOTION2. The first reference motion amount TH_MOTION1 and the second reference motion amount TH_MOTION2 may be preset values.

Referring to FIGS. 1, 12, and 14, the timing controller 200 may determines the luminance gain LG based on the accumulated deterioration amounts AGE of the panel blocks PB in the gain reduction region GRR. As the accumulated deterioration amounts AGE of the panel blocks PB in the gain reduction region GRR increase, the luminance gain LG may decrease. The timing controller 200 may maintain the luminance gain LG when the accumulated deterioration amounts AGE of the panel blocks PB in the gain reduction region GRR are less than or equal to a second reference deterioration amount TH_AGE2. The timing controller 200 may decrease the luminance gain LG when the accumulated deterioration amounts AGE of the panel blocks PB in the gain reduction region GRR are greater than the second reference deterioration amount TH_AGE2 and less than or equal to a third reference deterioration amount TH_AGE3. The timing controller 200 may maintain the luminance gain LG when the accumulated deterioration amounts AGE of the panel blocks PB in the gain reduction region GRR are greater than the third reference deterioration amount TH_AGE3. The accumulated deterioration amounts AGE of FIG. 13 may be one of a minimum value of the accumulated deterioration amounts AGE of the panel blocks in the gain reduction region GRR, a maximum value of the accumulated deterioration amounts AGE of the panel blocks in the gain reduction region GRR, an average value AGE_AVG of the accumulated deterioration amounts AGE of the panel blocks in the gain reduction region GRR, and the number of the accumulated deterioration amounts AGE of the panel blocks in the gain reduction region GRR greater than a first reference deterioration amount TH_AGE1. Here, the second reference deterioration amount TH_AGE2 and the third reference deterioration amount TH_AGE3 may be preset values.

Figure 16:
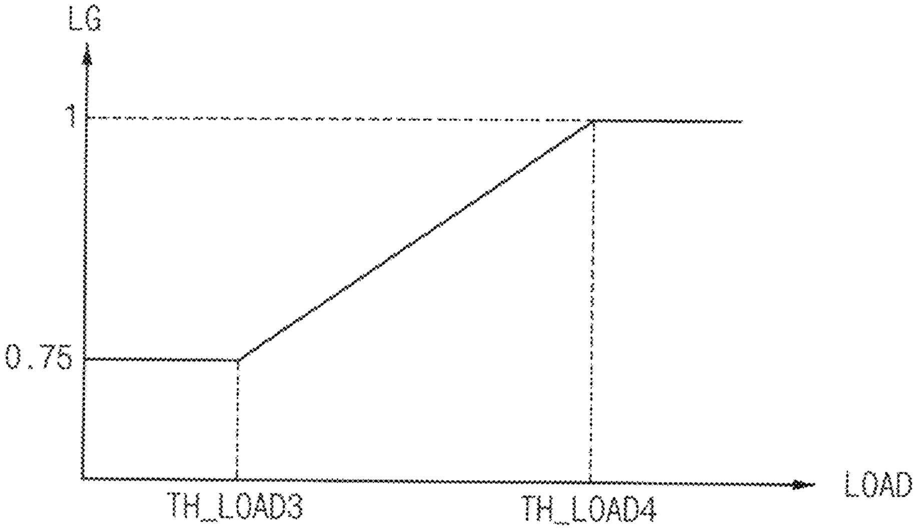
FIG. 16 is a graph illustrating an example in which a display device according to embodiments of the invention adjusts a luminance gain based on a load.
Figure 17:
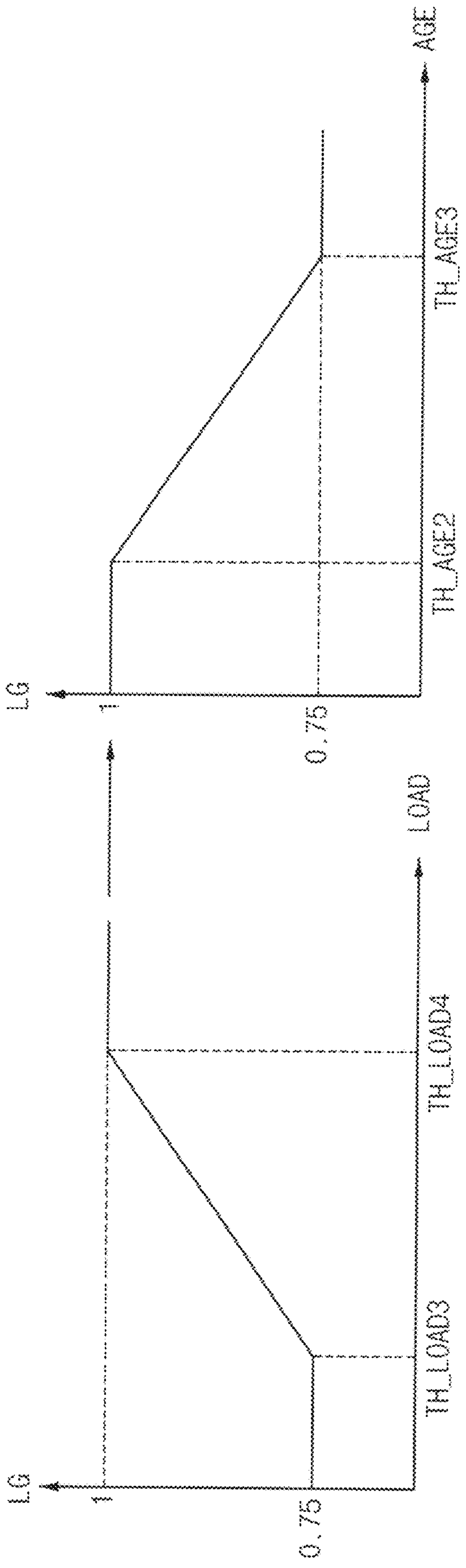
FIG. 17 is a graph illustrating an example in which the display device of FIG. 16 adjusts a luminance gain based on a load and accumulated deterioration amounts.

FIG. 16 is a graph illustrating an example in which a display device according to embodiments of the invention adjusts the luminance gain LG based on the load LOAD, and FIG. 17 is a graph illustrating an example in which the display device of FIG. 16 adjusts the luminance gain LG based on the load LOAD and the accumulated deterioration amounts AGE. FIG. 17 shows that the luminance gain LG determined based on the load LOAD is 1.

The embodiment of the display device shown in FIGS. 16 and 17 is substantially the same as the embodiment of the display device described above with reference to FIGS. 12 to 15 except for adjusting the luminance gain LG based on the load LOAD instead of the motion amount MOTION. Thus, the same reference numerals are used to refer to the same or similar elements, and any repetitive detailed description thereof will be omitted.

Referring to FIGS. 1, 16, and 17, in an embodiment, the timing controller 200 may decrease the luminance gain LG as the load LOAD of the input image data IMG decreases.

When the load LOAD is small (i.e., when the luminance is small), the darkening of the outer part CP may be relatively less visible than when the load LOAD is large. Accordingly, when the load LOAD is small, the display device may be desired to apply a smaller luminance gain LG than when the load LOAD is large.

The timing controller 200 may maintain the luminance gain LG when the load LOAD is less than or equal to a third reference load TH_LOAD3. The timing controller 200 may increase the luminance gain LG when the load LOAD is greater than the third reference load TH_LOAD3 and less than or equal to a fourth reference load TH_LOAD4. The timing controller 200 may maintain the luminance gain LG when the load LOAD is greater than the fourth reference load TH_LOAD4. The third reference load TH_LOAD3 and the fourth reference load TH_LOAD4 may be preset values.

Figure 18:
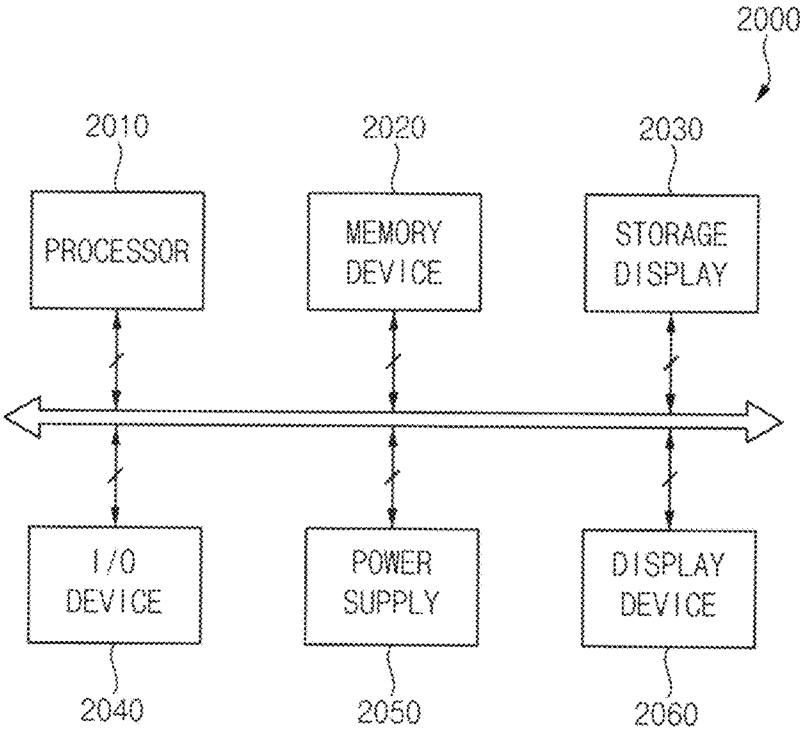
FIG. 18 is a block diagram showing an electronic device according to embodiments of the invention.
Figure 19:
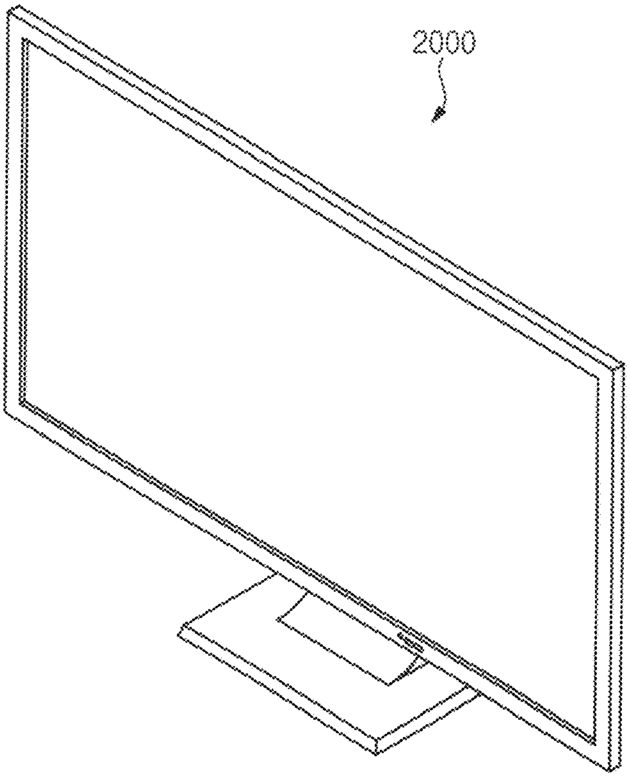
FIG. 19 is a diagram showing an embodiment in which the electronic device of FIG. 11 is implemented as a television.

FIG. 18 is a block diagram showing an electronic device according to embodiments of the invention, and FIG. 19 is a diagram showing an embodiment in which the electronic device of FIG. 18 is implemented as a television.

Referring to FIGS. 11 and 12, an embodiment of the electronic device 2000 may include a processor 2010, a memory device 2020, a storage device 2030, an input/output (I/O) device 2040, a power supply 2050, and a display device 2060. Here, the display device 2060 may correspond to an embodiment of the display device 1000 described above. In addition, the electronic device 2000 may further include a plurality of ports for communicating with a video card, a sound card, a memory card, a universal serial bus (USB) device, other electronic devices, etc. In an embodiment, as shown in FIG. 19, the electronic device 2000 may be implemented as a television. However, the electronic device 2000 is not limited thereto. In an embodiment, for example, the electronic device 2000 may be implemented as a cellular phone, a video phone, a smart pad, a smart watch, a tablet personal computer (PC), a car navigation system, a computer monitor, a laptop, a head mounted display (HMD) device, etc.

The processor 2010 may perform various computing functions. The processor 2010 may be a micro processor, a central processing unit (CPU), an application processor (AP), etc. The processor 2010 may be coupled to other components via an address bus, a control bus, a data bus, etc. Further, the processor 2010 may be coupled to an extended bus such as a peripheral component interconnection (PCI) bus.

The memory device 2020 may store data for operations of the electronic device 2000. In an embodiment, for example, the memory device 2020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc and/or at least one volatile memory device such as a dynamic random access memory (DRAM) device, a static random access memory (SRAM) device, a mobile DRAM device, etc.

The storage device 2030 may include a solid state drive (SSD) device, a hard disk drive (HDD) device, a CD-ROM device, etc.

The I/O device 2040 may include an input device such as a keyboard, a keypad, a mouse device, a touch pad, a touch screen, etc, and an output device such as a printer, a speaker, etc. In some embodiments, the I/O device 2040 may include the display device 2060.

The power supply 2050 may provide power for operations of the electronic device 2000. In an embodiment, for example, the power supply 2050 may be a power management integrated circuit (PMIC).

The display device 2060 may display an image corresponding to visual information of the electronic device 2000. In an embodiment, for example, the display device 2060 may be an organic light emitting display device or a quantum dot light emitting display device, but is not limited thereto. The display device 2060 may be coupled to other components via the buses or other communication links. In such an embodiment, the display device 2060 may reduce the set time based on the accumulated deterioration amounts. Accordingly, the display device 2060 may rapidly reduce luminance. In such an embodiment, the display device may reduce the luminance gain based on the accumulated deterioration amounts. Accordingly, the display device may reduce a rate at which a lifetime of pixels is shortened and power consumption, and effectively prevent an afterimage.

Embodiments of the invention may be applied to any electronic device including the display device, for example, a television (TV), a digital TV, a three-dimensional (3D) TV, a mobile phone, a smart phone, a tablet computer, a virtual reality (VR) device, a wearable electronic device, a PC, a home appliance, a laptop computer, a personal digital assistant (PDA), a portable multimedia player (PMP), a digital camera, a music player, a portable game console, a navigation device, etc.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

a display panel divided into panel blocks including pixels; and a display panel driver which drives the display panel, sets a time point to which a set time elapses from a time point when input image data is determined to be a still image as an operation time point, decreases a luminance gain from the operation time point, determines the set time based on accumulated deterioration amounts of the panel blocks, and applies the luminance gain to the input image data.

2. The display device of claim 1, wherein the set time decreases as a minimum value of the accumulated deterioration amounts increases.

3. The display device of claim 1, wherein the set time decreases as a maximum value of the accumulated deterioration amounts increases.

4. The display device of claim 1, wherein the set time decreases as an average value of the accumulated deterioration amounts increases.

5. The display device of claim 1, wherein the set time decreases as a number of the accumulated deterioration amounts greater than a first reference deterioration amount increases.

6. The display device of claim 1, wherein the display panel driver determines the set time based on the accumulated deterioration amounts and a load of the input image data.

7. The display device of claim 6, wherein the set time decreases as the load increases.

8. The display device of claim 1, wherein the display panel driver determines the luminance gain based on the accumulated deterioration amounts.

9. A display device comprising:

a display panel divided into panel blocks including pixels; and a display panel driver which drives the display panel, sets a time point to which a set time elapses from a time point when input image data is determined to be a still image as an operation time point, decreases a luminance gain from the operation time point, determines the luminance gain based on accumulated deterioration amounts of the panel blocks, and applies the luminance gain to the input image data.

10. The display device of claim 9, wherein the luminance gain decreases as a minimum value of the accumulated deterioration amounts increases.

11. The display device of claim 9, wherein the luminance gain decreases as a maximum value of the accumulated deterioration amounts increases.

12. The display device of claim 9, wherein the luminance gain decreases as an average value of the accumulated deterioration amounts increases.

13. The display device of claim 9, wherein the luminance gain decreases as a number of the accumulated deterioration amounts greater than a first reference deterioration amount increases.

14. The display device of claim 9, wherein the display panel driver determines the luminance gain based on the accumulated deterioration amounts and a load of the input image data.

15. The display device of claim 14, wherein the luminance gain decreases as the load increases.

16. A display device comprising:

a display panel divided into panel blocks including pixels; and a display panel driver which drives the display panel, decreases a luminance gain as an motion amount of input image data increases, determines the luminance gain based on accumulated deterioration amounts of the panel blocks in a gain reduction region of the display panel, and applies the luminance gain to the input image data corresponding to the gain reduction region.

17. The display device of claim 16, wherein the gain reduction region is located at an outer part of the display panel.

* * * * *